US006494498B2

United States Patent
Brandt et al.

(10) Patent No.: US 6,494,498 B2
(45) Date of Patent: Dec. 17, 2002

(54) LATCHABLE LINE CONNECTOR, IN PARTICULAR FOR FUEL LINES

(75) Inventors: Josef Brandt, Wipperfurth (DE); Marco Isenburg, Halver (DE)

(73) Assignee: Voss Automotive GmbH, Wipperfurth (DE)

( * ) Notice: Subject to any disclaimer, the term of this patent is extended or adjusted under 35 U.S.C. 154(b) by 0 days.

(21) Appl. No.: 09/852,725

(22) Filed: May 10, 2001

(65) Prior Publication Data

US 2002/0053799 A1 May 9, 2002

(30) Foreign Application Priority Data

May 10, 2000 (DE) ........................... 200 08 378 U

(51) Int. Cl.⁷ .............................................. F16L 39/00
(52) U.S. Cl. ................. 285/319; 285/190; 285/297; 285/921
(58) Field of Search ................. 285/190, 297, 285/921, 125.1, 133.11, 133.21

(56) References Cited

U.S. PATENT DOCUMENTS

| 3,806,031 A | * | 4/1974 | Olson ........................ 137/861 |
| 4,316,622 A | * | 2/1982 | Nelson ........................ 285/921 |
| 4,865,361 A | | 9/1989 | Koukal |
| 5,095,564 A | | 3/1992 | Kruger |
| 5,167,213 A | | 12/1992 | Bassler |
| 5,806,897 A | * | 9/1998 | Nagai et al. ............. 285/125.1 |
| 6,193,281 B1 | * | 2/2001 | Nagai et al. ............. 285/125.1 |
| 6,293,011 B1 | * | 9/2001 | Hasegawa et al. ........ 285/125.1 |
| 6,427,710 B1 | * | 8/2002 | Griesbaum et al. ......... 285/921 |

FOREIGN PATENT DOCUMENTS

| DE | 196 50 535 | 6/1998 |
| EP | 0 918 156 | 5/1999 |

* cited by examiner

Primary Examiner—Lynne H. Browne
Assistant Examiner—Aaron M Dunwoody
(74) Attorney, Agent, or Firm—Kilpatrick Stockton LLP

(57) ABSTRACT

A latchable line connector having a plug-in part for connecting at least one pressure or flow line, such as a fuel line, into a plug-in opening of a connector counterpart. Mechanical stress between the plug-in part and the connector counterpart is reduced by resilient latching arms that grip around and behind the plug-in part in the plugged-in position and thereby latch it relative to the connector counterpart in a manner secure against tilting and twisting.

18 Claims, 3 Drawing Sheets

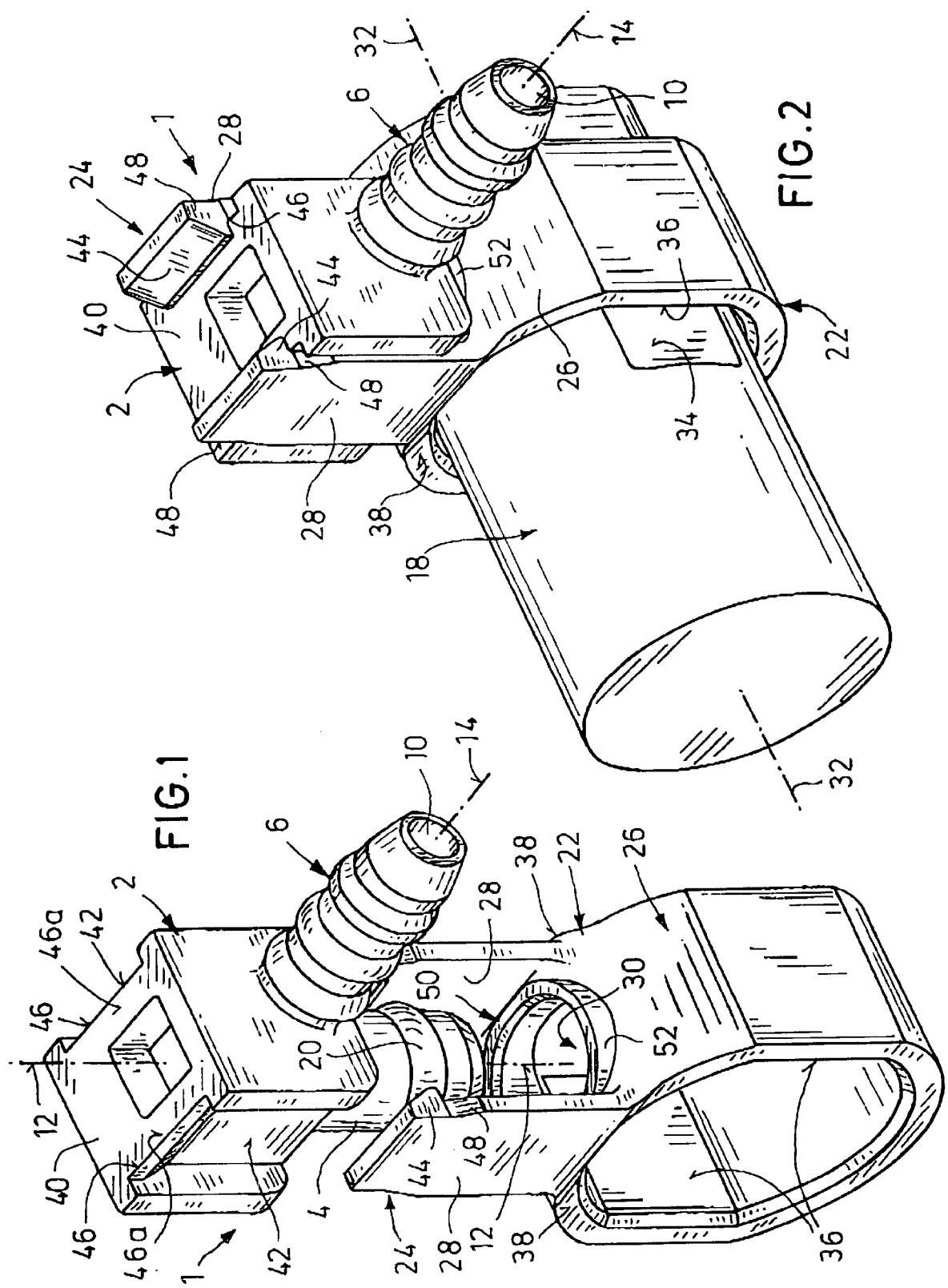



LATCHABLE LINE CONNECTOR, IN PARTICULAR FOR FUEL LINES

FIELD OF THE INVENTION

The present invention relates to a latchable line connector for the connection of at least one pressure-medium and/or flow-medium line, in particular a fuel line, onto a connector counterpart, comprising a plug-in part having a plug-in stem which can be plugged in a sealed manner into a plug-in opening of the connector counterpart, and at least one line outlet, and also comprising latching means for locking the plug-in stem in its plugged-in position, and comprising a separate retaining part having the latching means.

BACKGROUND OF THE INVENTION

A line connector of this type is disclosed by German utility model 297 21 023. In this case, the retaining part which has two resilient latching arms as latching means is connected movably to the plug-in part in such a manner that the plugging-in of the plug-in stem and the latching of the latching means can be carried out independently of one another. This means that, first of all, only the plug-in stem is plugged in. Only after that does the latching take place by means of a corresponding movement of the retaining part, which then grips in a latching manner with the latching arms around the connector counterpart and thereby locks the plug-in part against becoming detached.

DE 195 05 574 A1 discloses a further, similar line connector in which, however, the plug-in part is formed integrally with resilient retaining arms in some designs. In this case too, the retaining arms of the plug-in connector grip in a latching manner around the housing which has the receiving hole.

The present invention is based on the object of improving a line connector of the generic type in such a manner that a connection which is particularly secure against mechanical stresses is achieved between the plug-in part and the connector counterpart using means which are simple and are of good value in terms of construction and production.

SUMMARY OF THE INVENTION

According to the invention, this is achieved in that the retaining part comprises a retaining section for the retaining connection to the connector counterpart in a manner secure against tilting and twisting, and comprises at least two resilient latching arms which form the latching means, in which case the plug-in part can be plugged in between the latching arms in such a manner that the latching arms grip around the plug-in part in the plugged-in position and grip behind it in a latching manner and thereby fix it relative to the connector counterpart also in a manner secure against tilting and twisting. The retaining part can therefore first of all be connected via its retaining section mechanically to the connector counterpart. After the plug-in stem has subsequently been plugged into the plug-in opening, the latching arms of the retaining part are used to also connect the entire plug-in part to the connector counterpart in a manner which is mechanically secure against tilting and twisting, i.e. in a defined alignment with respect to the plug-in axis of the plug-in stem and also with respect to an outlet axis of the line outlet, which is preferably designed as a tubular or hose-type connecting branch with a pointed profile. In this case, the retaining part may be designed, in particular, as an integral plastic shaped part in a manner which is simple and represents good value.

DESCRIPTION OF DRAWINGS

The invention will be explained more precisely with reference to preferred exemplary embodiments which are shown in the drawing, in which:

FIG. 1 shows a perspective view of the essential components of a line connector according to the invention prior to the connection to a connector counterpart, FIG. 2 shows a perspective view of the line connector according to the invention in its plugged-in state in which it is connected to the connector counterpart.

DESCRIPTION OF PREFERRED EMBODIMENT

Figure 3:
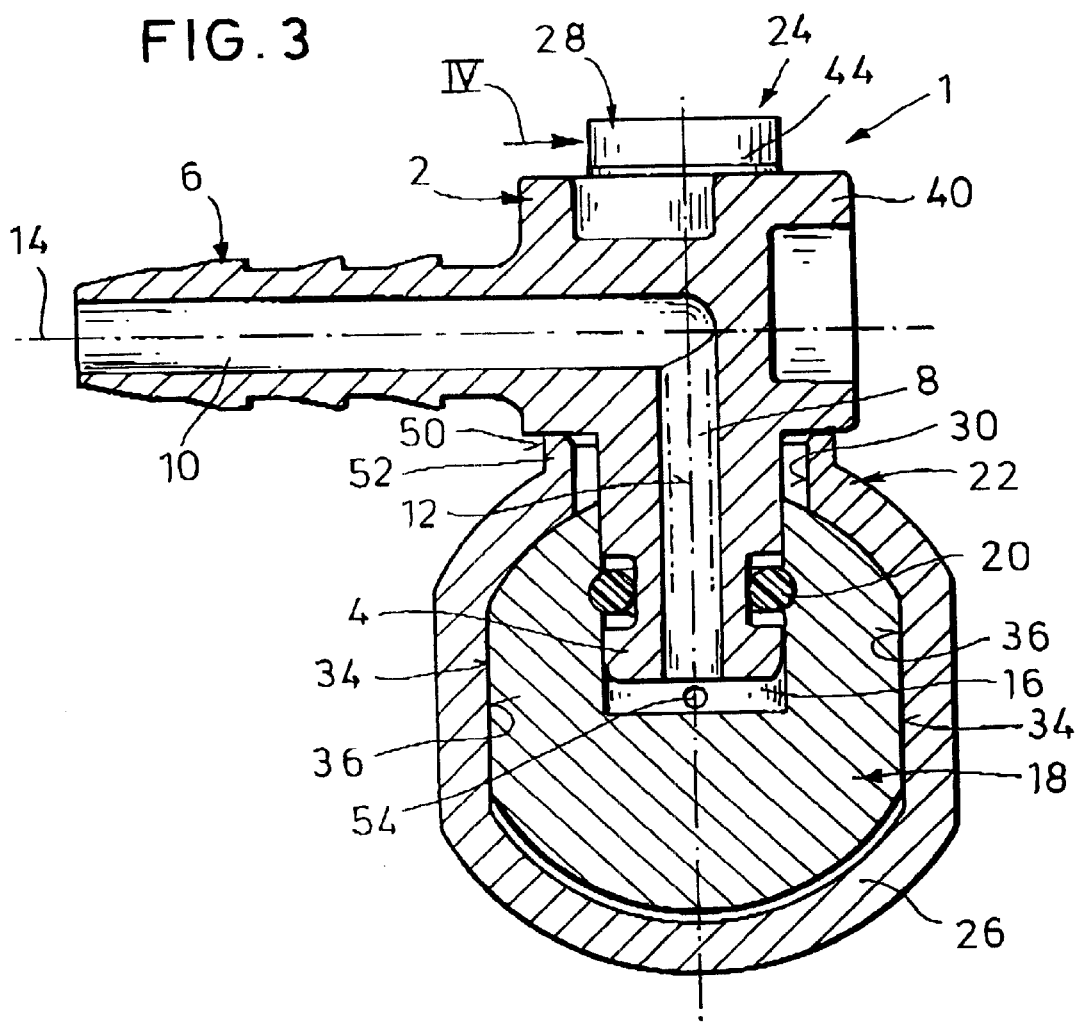
FIG. 3 shows a cross section through the entire arrangement in the plugged-in position according to FIG. 2.

In the various figures of the drawing, parts which are identical or correspond in terms of function are also provided throughout with the same reference numbers.

A line connector 1 according to the invention comprises a plug-in part 2 together with a plug-in stem 4 and at least one line outlet 6. The plug-in stem 4 has an inner through channel 8 (see FIG. 3) which merges into an inner channel 10 of the line outlet 6. In the preferred exemplary embodiment which is illustrated, the plug-in stem 4, as regards its plug-in axis 12, and the line outlet 6, as regards its outlet axis 14, run at right angles to each other, i.e. the axes 12, 14 enclose an angle of 90°. The line outlet 6 is preferably designed as a connecting branch having a pointed profile for the attachment of a pipeline or hose line (not illustrated).

The plug-in part 2 can be plugged with the plug-in stem 4 into a plug-in opening 16 of a connector counterpart 18. For sealing purposes, the plug-in stem 4 bears a sealing ring 20 in an outer annular groove.

In order to lock the plug-in stem 4 in its plugged-in position (FIGS. 2 and 3), a separate retaining part 22 having latching means 24 is provided.

According to the invention, the retaining part 22 comprises a retaining section 26 for the retaining connection to the connector counterpart 18 in a manner secure against tilting and twisting, and comprises at least two resilient latching arms 28 which form the latching means 24. After the retaining part 22 has been connected to the connector counterpart 18 via the retaining section 26, the plug-in part 2 can be plugged in between the latching arms 28 in such a manner that the latching arms 28 grip around the plug-in part 2 in the plugged-in position and grip behind it in a latching manner and thereby fix it relative to the connector counterpart 18 also in a manner secure against tilting and twisting.

In the preferred refinement, for this purpose the retaining section 26 of the retaining part 22 is of essentially annular design and, as a result, can be pushed axially onto the essentially elongated cylindrical connector counterpart 18 in such a manner that, in the pushed-on position according to FIG. 2, the annular retaining section 26 surrounds the connector counterpart 18 in the region of the plug-in opening 16 (see FIG. 3 for this) with just a slight clearance which enables it to be pushed on. In this case, the annular retaining section 26 has a passage opening 30 for the plug-in stem 4, which opening leaves the region of the plug-in opening 16 free (cf. also FIG. 1 for this).

The annular retaining section 26 is designed in such a manner that, in its position sitting on the connector counterpart 18 (FIG. 2), it is secured against rotation about the longitudinal axis 32 of the connector counterpart 18 and also against tilting relative to the longitudinal axis 32. This is firstly achieved by the fact that the annular retaining section 26 is of a relatively great width, as seen in the direction of the longitudinal axis 32. Secondly, the annular retaining section 26 has an internal cross-sectional shape which deviates from the circular shape, and the connector counterpart 18 has a correspondingly matched external cross-sectional shape in this region. Preferably, as illustrated, the largely cylindrical connector counterpart 18 has, in its region provided for connection to the retaining section 26, two diametrically opposite, outer flattened portions 34, what are referred to as key surfaces, and the retaining section 26 has two corresponding, inner bearing surfaces 36.

The two latching arms 28 are in each case of strip-shaped design in such a manner that they lie in planes which are essentially parallel to one another and perpendicular with respect to the longitudinal axis 32. In this case, the two latching arms 28 are arranged such that they emanate radially from the two end edges 38 of the annular retaining section 26 in such a manner that they are arranged, as seen in the direction of the longitudinal axis 32 of the connector counterpart 18, spaced apart approximately parallel to each other on both sides next to the plug-in opening 16 and the passage opening 30 of the retaining section 26. As a result, the two latching arms 28 delimit between them a receiving space for the plug-in part 2 and for a preferably approximately cuboidal section 40 which is arranged between the plug-in stem 4 and the line outlet 6. In this connection, the two latching arms 28 advantageously interact with guide depressions 42 of the plug-in part 2 and of its section 40 in order to guide the said plug-part in a tilt-free manner. This ensures that the plug-in part 2 is guided in a manner secure against tilting even while it is being plugged in.

At their free ends, the latching arms 28 have mutually facing latching lugs 44 for latching edges 46 of the plug-in part 2 to grip behind, in particular in a form-fitting manner. In addition, lateral guide slopes 48 which facilitate the introduction of the plug-in part 2 are formed on the free ends of the latching arms 28.

As FIGS. 1 and 3 furthermore also reveal, the retaining part 22 has bearing means 50, preferably in that region of the retaining section 26 which lies between the latching arms 28, for placing the plug-in part 2 against in a manner restricting its plugging in. The bearing means 50 are preferably formed by an annular web 52 which surrounds the passage opening 30.

By means of the described, particular arrangement of the latching arms 28, it is advantageously possible to align the line outlet 6, as regards its outlet axis 14, in each case approximately perpendicularly with respect to the plug-in axis 12 of the plug-in stem 4 and with respect to the longitudinal axis 32 of the connector counterpart 18.

The retaining part 22 with its retaining section 26 and the latching arms 28 can preferably be designed as an integral shaped part made of plastic. PEI (polyetherimide, for example obtainable under the trade name "Ultem") is particularly suitable, especially because of its good high-temperature stability, in particular at relatively high temperatures prevailing, for example, in the engine region of the motor vehicle, and is particularly suitable specifically for ensuring good elasticity of the latching arms, preferably without a fiber-reinforcing component. However, as an alternative, the retaining part may also be made of metal, for example brass. The plug-in part 2 can likewise consist of plastic or metal, in which case PEI with (glass) fiber reinforcement, for example PEI GF 20, is preferably used as the plastic in order to achieve good stability. The components (in particular the plug-in part and retaining part) may consist in each case of the same material, but in particular of different materials.

The connector counterpart 18 is, for example, what is known as a rail injector having a leak-oil return for fuel injection systems, in particular for diesel fuel, in accordance with DIN EN 590. In this case, a channel 54 opens into the plug-in opening 16 (see FIG. 3), so that this channel 54 is connected to the through channel 8 of the plug-in stem 4 which is being plugged in.

The line connector 1 according to the invention ensures a mechanically very secure connection to the connector counterpart 18. The retaining part 22 is therefore seated on the connector counterpart 18 in a manner so that, although it can be displaced by the annular retaining section 26 in the direction of the longitudinal axis 32, it is secured against twisting and tilting. After the plug-in part 2 has been inserted, the retaining part 22 is also fixed against axial displacement by the plug-in stem 4 engaging in the plug-in opening 16 through the passage opening 30.

Figure 4:
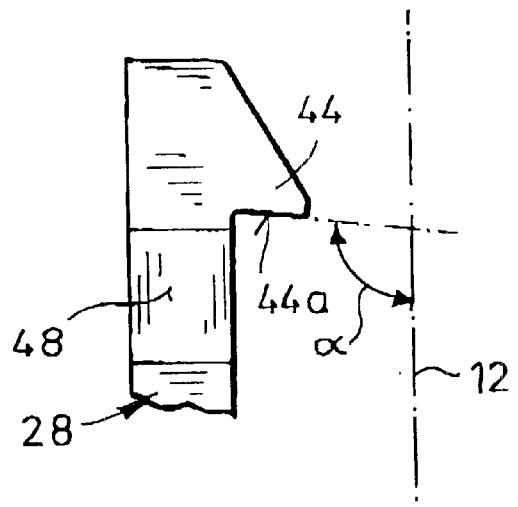
FIG. 4 shows an enlarged detailed view in the arrow direction IV according to FIG. 3 in the region of one of the latching arms of the retaining part.

As FIG. 4 in conjunction with FIG. 1 and FIGS. 5 to 7 additionally reveals, the latching lugs 44 and the latching edges 46 have, in the region of their interacting surfaces 44a, 46a, an effective surface angle $\alpha \geq 90°$, as a result of which a pure form-fitting engagement is achieved in the region of the latching means 24. According to FIG. 4, the effective surface angle $\alpha$ is preferably >90° in order to form an undercut. By this means, very high retaining forces (extraction forces) are achieved. In this case, it is also possible to only design the latching lug 44 with an undercut angle >90°, in accordance with FIG. 4, but to select an angle of 90° in the region of the latching edges 46. This also enables high extraction forces to be achieved because, first of all, starting from a linear bearing, a tilting or bending moment causes the surface 44a to fit in a planar manner against the mating surface 46a. This is also advantageous with respect to any production tolerances so as to ensure in any case a purely form-fitting latching connection.

Figure 5:
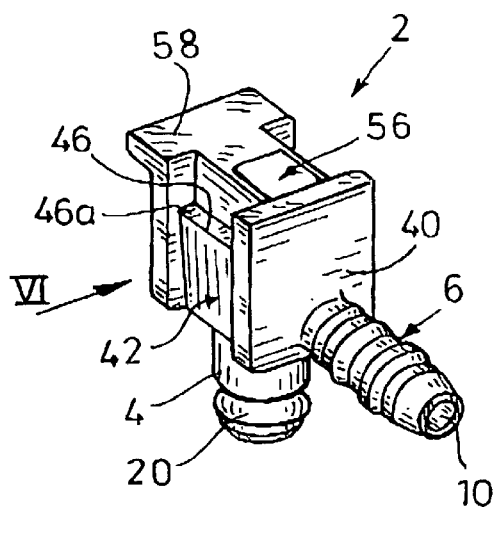
FIG. 5 shows a design variant of the plug-in part in perspective view.
Figure 6:
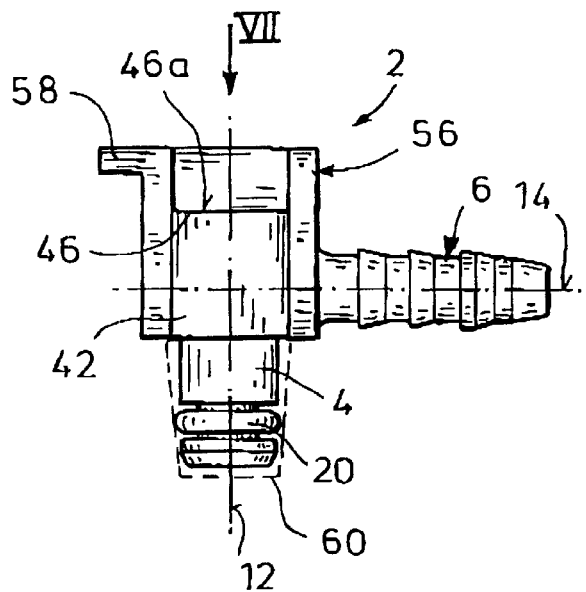
FIG. 6 shows a side view of the plug-in part in the arrow direction VI according to FIG. 5.
Figure 7:
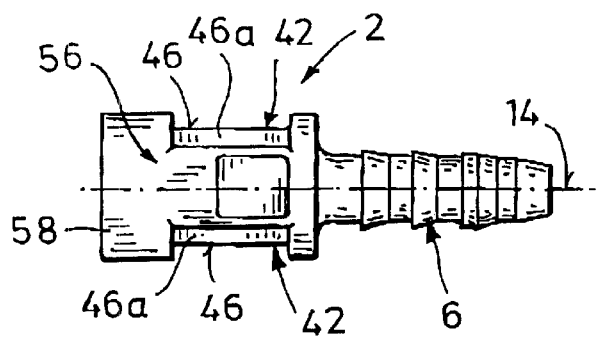
FIG. 7 shows a plan view in the arrow direction VII according to FIG. 6.

In the case of the design variant illustrated in FIGS. 5 to 7, the plug-in part 2 has, on its side lying opposite the plug-in stem 4, as seen in the direction of the plug-in axis 12, an actuating section 56 which projects over the latching edges 46. This actuating section 56 has the advantageous effect that, during the plugging-in process, the operator is able to avoid touching the latching arms 28 of the retaining part 22 with his finger or thumb, which could have the effect of the locking not taking place in accordance with desires possibly because the latching arms 28 have been spread. However, the actuating section 56 advantageously means that the finger or thumb is no longer able to get into the region between the latching arms 28. Furthermore, it is advantageous for detaching and pulling out the plug-in part 2 if the plug-in part 2 or the actuating section 56 has a gripping projection 58. In the exemplary embodiment illustrated, this gripping projection 58 is designed in the form of a web in such a manner that it extends projecting perpendicularly with respect to the plug-in axis 12, particularly in a direction which is opposed to the line outlet 6. As a result, the gripping projection 58 can readily be gripped underneath by the finger and the plug-in part 2 therefore extracted.

As is also revealed in FIG. 6, for the purpose of transporting and/or storing the plug-in part 2 in a state in which it is not plugged in and is independent of the connector counterpart and of the retaining part, a protective cap 60 (only indicated by dashed lines) can be provided which can be placed onto the plug-in stem 4 in particular in a frictional and/or form-fitting manner. By this means, protection against mechanical stress and soiling can be achieved.

Furthermore, in the design according to FIGS. 5 to 7, provision can be made for sloping surfaces to be formed in the region of the guide depressions 42 in such a manner that, when the plug-in part 2 is plugged in between the latching arms 28, the latter are spread over the sloping surfaces until they grip around the latching edges 46. One of the sloping surfaces in the region of the guide depression 42 can best be seen in the perspective view according to FIG. 5.

The invention is not restricted to the exemplary embodiment which is specifically illustrated and described, but also comprises all designs acting in an identical manner within the meaning of the invention.

What is claimed is:

1. A latchable line connector (1) for the connection of at least one pressure-medium or flow-medium line onto a connector counterpart (18), comprising a plug-in part (2) having a plug-in stem (4) which can be plugged in a sealed manner into a plug-in opening (16) of the connector counterpart (18), and at least one line outlet (6), and also comprising latching means (24) for locking the plug-in stem (4) in a plugged-in position, and comprising a retaining part (22) separate from the plug-in stem and from the connector counterpart and having the latching means (24), wherein the retaining part (22) comprises a retaining section (26) for the retaining connection to the connector counterpart (18) in a manner secure against tilting and twisting, and comprises at least two resilient latching arms (28) which form the latching means (24), in which case the plug-in part (2) can be plugged in between the latching arms (28) in such a manner that the latching arms (28) grip around the plug-in part (2) in the plugged-in position and grip behind it in a latching manner and thereby fix it relative to the connector counterpart (18) also in a manner secure against tilting and twisting.

2. The line connector as claimed in claim 1, wherein the retaining part (22) together with the retaining section (26) and the latching arms (28) is designed as an integral shaped part made of plastic.

3. The line connector as claimed in claim 1, wherein the retaining part (22) is made of metal.

4. The line connector as claimed in claim 1, wherein the retaining section (26) of the retaining part (22) is of essentially substantially annular design and can be pushed axially onto the essentially elongated cylindrical connector counterpart (18) in such a manner that the returning section surrounds the connector counterpart (18) in the region of the plug-in opening (16), in which case the annular retaining section (26) has a passage opening (30) for the plug-in stem (4), which opening leaves the plug-in opening (16) free.

5. The line connector as claimed in claim 4, wherein, in position surrounding the connector counterpart (18), the annular retaining section (26) is secured against twisting about the longitudinal axis (32) of the connector counterpart (18) and against tilting relative to the longitudinal axis (32).

6. The line connector as claimed in claim 5, wherein the annular retaining section (26) has an internal cross-sectional shape deviating from a circular shape and the connector counterpart (18) has a correspondingly matched external cross-sectional shape.

7. The line connector as claimed in claim 6, wherein the connector counterpart (18) has two diametrically opposite, outer flattened portions (34) and the retaining section (26) has two corresponding, inner bearing surfaces (36).

8. The line connector as claimed in claim 4, wherein the two latching arms (28) are arranged such that they emanate radially from two end edges (38) of the annular retaining section (26) in such a manner that they are arranged, as seen in the direction of the longitudinal axis (32) of the connector counterpart (18), spaced apart approximately parallel to each other on both sides next to the plug-in opening (16) and the passage opening (30) of the retaining section (26).

9. The line connector as claimed in claim 1, wherein the two latching arms (28) interact with guide depressions (42) of the plug-in part (2) in order to guide the latter in a tilt-free manner.

10. The line connector as claimed in claim 1, wherein the latching arms (28) have, on the end side, mutually opposite latching lugs (44) for latching edges (46) of the plug-in part (2) to grip behind, in a form-fitting manner.

11. The line connector as claimed in claim 10, wherein the latching lugs (44) and the latching edges (46) have, in the region of their interacting surfaces (44a, 46a), an effective surface angle ($\alpha$) of at least equal to 90° in such a manner that a pure form-fitting engagement is achieved.

12. The line connector as claimed in claim 1, wherein the retaining part (22) has bearing means (50) in that region of the retaining section (26) which lies between the latching arms (28) for placing the plug-in part (2) against in a manner restricting its plugging in, the bearing means (50) being formed by an annular web (52) which encloses the passage opening (30).

13. The line connector as claimed in claim 1, wherein the line outlet (6) of the plug-in part (2), which outlet is designed as a connecting branch with a pointed profile, extends in the direction of an outlet axis (14) which is substantially perpendicular with respect to the longitudinal axis (32) of the connector counterpart (18) and with respect to the plug-in axis (12) of the plug-in stem (4).

14. The line connector as claimed in claim 10, wherein the plug-in part (2) has, on its side opposite the plug-in stem (4), an actuating section (56) which projects over the latching edges (46).

15. The line connector as claimed in claim 14, wherein the plug-in part (2), in the region of the actuating section (56), has a gripping projection (58) which protrudes substantially perpendicularly with respect to the plug-in axis (12) and extends in a direction opposed to the line outlet (6).

16. The line connector as claimed in claim 1, wherein the plug-in part (2) consists of plastic.

17. The line connector as claimed in claim 16, wherein the plastic is polyetherimide with a fiber component.

18. The line connector as claimed in claim 11, wherein the effective surface angle is greater than 90° in order to form an undercut.

* * * * *